Patented Feb. 24, 1948

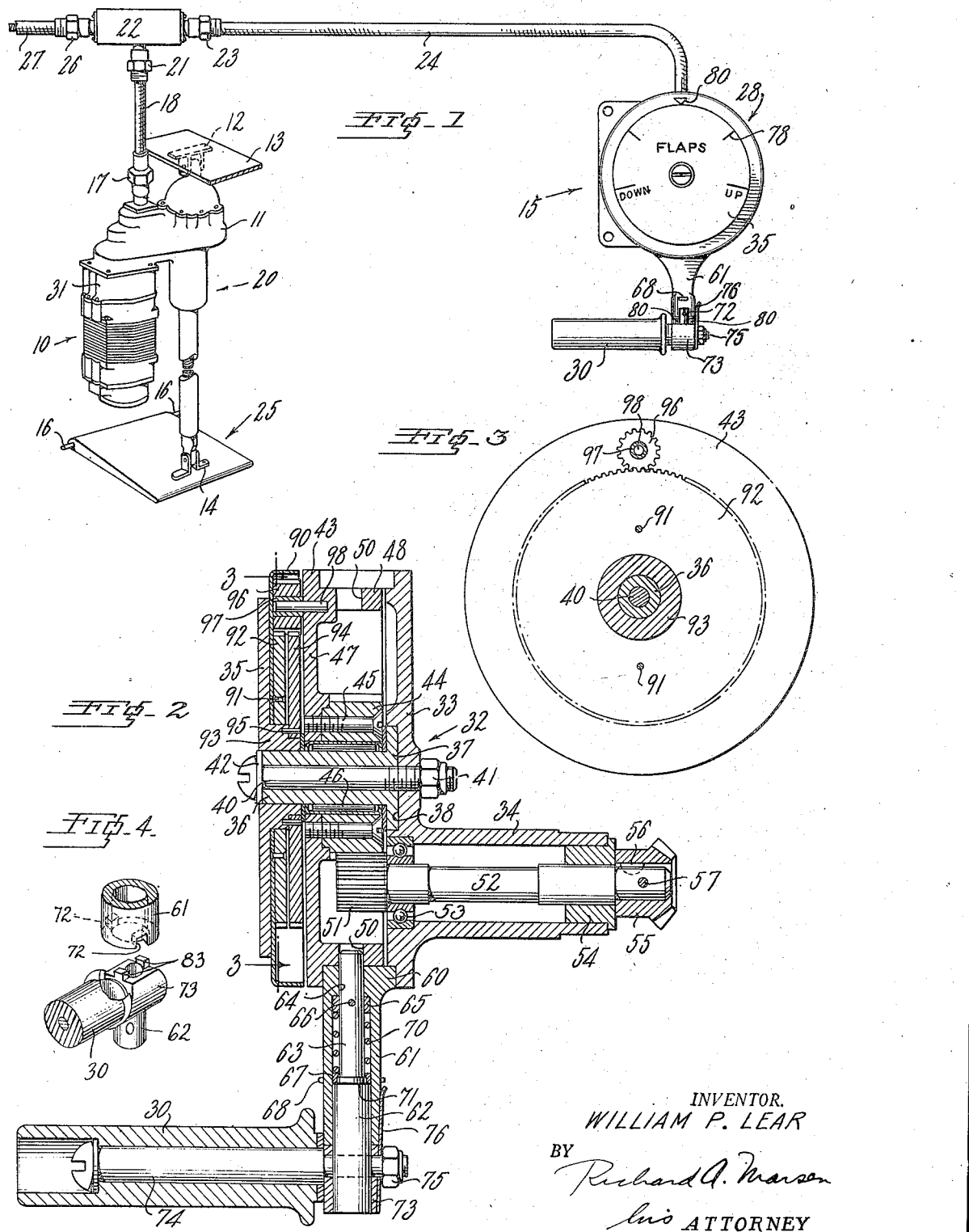

2,436,583

UNITED STATES PATENT OFFICE 2,436,583

REMOTE-CONTROL AND INDICATOR SYSTEM

William P. Lear, North Hollywood, Calif., assignor, by mesne assignments, to Lear, Incorporated, Grand Rapids, Mich., a corporation of Illinois Application September 29, 1943, Serial No. 504,259

5 Claims. (Cl. 116—124)

This invention relates to remote positioning and indicating systems, and more particularly to such systems comprising selectively operable power drive means and manual drive means for an actuated member, with means for indicating the position thereof.

Aboard modern aircraft, many of the various accessories such as landing gear, wing flaps, ailerons, and so forth, are power actuated, with the power drive means being remotely controlled from a position adjacent the pilot. To insure continued operation of these devices at all times, and particularly in the event of failure of the power drive means, it is desirable to provide manual driving means for actuating the accessories in such event. It is also desirable that a remote indication of the position of the actuated accessory be available adjacent the pilot's location.

It is among the objects of this invention to provide a remote position indicating system including an actuator for a driven member, which actuator may be either power driven or manually driven; to provide such a system in which the power drive means and the manual drive means are selectively connectable to the actuator; to provide such a system including means for continuously indicating the position of the actuated member irrespective of whether the same is being operated by the power drive means or the manual drive means; to provide such a system including means operable, upon energization of the power driving means, to connect the same to the actuator, and, upon deenergization of the power drive means to disconnect the same from the actuator; to provide such a system including selectively operable means effective to connect the manual driving means to the actuator; and to provide a simple and reliable remote positioning and indicating system.

These and other objects, advantages and features of the invention will become apparent from the following description and the accompanying drawing. In the drawing:

Fig. 1 is a schematic view of one embodiment of the invention.

Fig. 2 is a vertical sectional view through a combined indicator and manual drive means forming part of the invention.

Fig. 3 is a view on the line 3—3 of Fig. 2.

Fig. 4 is an exploded perspective view to show the handle locking means.

Generally speaking, according to the principles of the present invention, a remote control and position indicating system is provided effective to actuate a driven member and to continuously indicate the actuated position thereof. The system preferably includes a power drive means and means effective, upon energization thereof, to connect the same to an actuator for operating the driven member. The connecting means, which may be a clutch device such as an electromagnetic clutch, is effective, upon deenergization of the power drive means, to disconnect the latter from the actuator. The system further includes a remotely positioned combined manual drive means and indicator. The manual drive means is selectively connectable to the actuator for the driven member. The indicator is effective at all times to indicate the position of the actuated member, irrespective of whether the power drive means or the manual drive means is connected for actuating the member.

Referring more particularly to the drawing, a power drive means, such as an electric motor 10 and a combined manual drive means and indicator 15 are shown in operative association with an actuator 20 effective to controllably position a driven member such as an airplane wing flap 25. The unit comprising power drive means 10 and actuator 20 may be of the type described and claimed in my copending application Serial No. 490,136, filed June 9, 1943, for "Multiple actuator system," now Patent No. 2,366,734, issued January 9, 1945, and assigned to the same assignee as this case. As described in said patent, the power drive means includes an electromagnetic clutch 31, which is effective, upon energization of the power drive means, to connect the same to the actuator 20. Upon deenergization of the electric motor 10, electromagnetic clutch 31 becomes deenergized to disconnect motor 10 from actuator 20 and remove the load of motor 10 from the system. Actuator 20 is connected through gearing 11 to electromagnetic clutch 31 and is hingedly connected as at 12 to a fixed portion 13 of an aircraft. At its opposite end, a hinged connection 14 connects actuator 20 to wing flap 25, which may be suitably pivoted to the aircraft fuselage as at 16. Actuator 20 may be a screw jack of the type described and claimed in my Patent No. 2,267,114.

Gearing 11 is connected through a coupling member 17 to driving mechanism such as flexible shafting 18. A coupling 21 connects shafting 18 to a right angle gear drive 22. The gears in drive 22 are connected through a coupling 23 to another flexible shafting 24. Shafting 24 is suitably connected to indicator and manual drive means 15. A coupling 26 may be provided to connect the system to flexible shafting 27 which may be associated with another combined power drive means and actuator unit in the manner more fully set forth in my aforesaid Patent No. 2,366,734.

The combined manual drive means and indicator 15 includes an indicator assembly 28 and a crank handle 30 which is selectively connectable to the indicating assembly to actuate member 25 through actuator 20, in the event of failure of power drive means 10. The construction of the combined indicator and manual drive means 15 is more clearly illustrated in Figs. 2 and 3. As shown, it comprises a housing 32 having a back plate 33, with a bearing sleeve 34 integral therewith, and a front plate 35. A bearing member 36 is provided with a flange 37 which fits in a recess 38 in back plate 33. A bolt 40 and nut 41 connect bearing member 36 to the back plate and hold it in assembled relation therewith. Front plate 35 is press-fitted onto bearing member 36 and is retained thereon through the medium of a washer 42 associated with bolt 40.

The manual driving means includes an annular member 43 to which is secured a spur gear 44 through screws 45. Member 43 and spur gear 44 are mounted on bearing member 36 through the medium of roller bearings 46. Annular member 43 includes a circular plate portion 47 and a rim portion 48 provided with apertures 50. Spur gear 44 is adapted to have driving engagement with a pinion 51 secured on a shaft 52 mounted in bearings 53 and 54 in bearing sleeve 34. A bevel pinion 55 is mounted on the outer end of shaft 52 and secured against rotation thereon by a key 56. A pin 57 holds the pinion against longitudinal displacement on shaft 52.

Manual drive means 30 includes a ring member 60 which is mounted on rim portion 48 of member 43. Ring member 60 is provided with a radially extending sleeve 61 in which is slidably mounted a plunger 62. Plunger 62 has a reduced portion 63 which is adapted to extend through an aperture 64 in ring 60 and enter one of the apertures 50 in rim portion 48 of member 43. A collar 65 is secured on plunger 62 by a pin 66. A washer 67 is secured in sleeve 61 by suitable means such as a cotter pin 68. A spring 70 surrounding reduced portion 63 and engaging collar 65 and washer 67 normally urges plunger 62 inwardly. A shoulder 71 formed at the junction of reduced portion 63 with the remainder of plunger 62 limits inward movement of plunger 62 under the influence of spring 70. As shown more particularly in Figs. 1 and 4, the lower end of sleeve 61 is formed with a pair of diametrically positioned notches 72—72 through the wall thereof. The notches 72 are adapted to be engaged by a pair of similarly formed projections 81—81 formed on a bushing 73 secured to plunger 62 by a bolt 74 and nut 75. Bolt 74 and nut 75 also serve to secure crank handle 30 to plunger 62. A flat spring 76 is provided to maintain the handle in tight engagement with the sleeve 61.

In the position shown in Fig. 2, the handle 30 is swung to operative position. In such position, portion 63 of plunger 62 extends into one of the apertures 50 in member 43, and the projections 81—81 enter the notches 72—72 to lock the handle in that position. The handle is therefore connected to drive member 43, spur gear 44, pinion 51, shaft 52, and gear 55, which latter is connected through suitable means (not shown) to shaft 24. When the portion 63 is to be disengaged from an aperture 50 the handle 30 is forced downwardly against the spring 70 to withdraw the projections 81—81 from the notches 72—72 and the handle may then be rotated 90° and released whereupon it is locked in inoperative position as shown in Fig. 1. Under such circumstances, manual driving means 30 is disconnected from pinion 55 and thus from shafting 24.

The arrangement for indicating the actuated position of member 25 comprises a series of indicia 78 on front plate 35 of housing 32. These indicia cooperate with a pointer 80 on a flange plate 90 secured by rivets 91 to a spur gear 92. Spur gear 92 is rotatably mounted on a shoulder 93 formed integral with front plate 35. Immediately adjacent spur gear 92 is a second spur gear 94 which is fixedly secured by a pin 95 to shoulder 93. Spur gears 92 and 94 are of substantially the same diameter. However, for a purpose to be described hereinafter, one of the spur gears, such as gear 92, is provided with at least one less tooth than the other. A pinion 96 is rotatably mounted through a bushing 97 on a pin 98 secured to member 43, and engages gears 92 and 94.

The indicating mechanism works as follows. Upon rotation of member 43, either through the medium of crank handle 30 or by being driven through gear 55 and pinion 51, pinion 96 will revolve around gears 92 and 94. As there is a difference of at least one in the number of teeth on gears 92 and 94, during each revoltion of pinion 96 movable gear 92 will be moved a distance corresponding to the number of teeth difference between gears 92 and 94. This, accordingly, will move pointer 80 in one direction or the other, to indicate the actuated position of member 25. The relative ratio of the number of teeth on the gears 92 and 94 is chosen in accordance with the number of revolutions of pinion 96 effected during movement of member 25 from one position to the other.

Under normal conditions of operation, member 25 is moved through the medium of motor 10 and clutch 31. Motor 10 may be energized for operation in one direction or the other by a suitable control switch located adjacent the pilot. Upon energization of motor 10, electromagnetic clutch 31 substantially instantaneously connects the motor to gearing 11 to thus drive actuator 20. Gearing 11, through shafting 18 and 24 will rotate shaft 52 and thus member 43. As a result, the actuated position of member 25 will be indicated by movement of pointer 80 with reference to indicia 78. When pointer 80 indicates that member 25 is at the desired position, the pilot may open the control switch, deenergizing motor 10. At such time, electromagnetic clutch 21 is deenergized and motor 10 is disconnected from actuator 20.

In the event of failure of the power supply or of motor 10, handle 30 may be moved from the position shown in Fig. 1, to that shown in Fig. 2. Handle 30 is then connected to member 43 and actuator 20 is driven through the medium of pinion 55, shafting 24, drive 22, shafting 18 and gearing 11. As member 43 is rotated when member 25 is manually actuated, pointer 80 will give an indication of the position of member 25 in the same manner as previously described.

If desired, electromagnetic clutch 31 may be of the type described in my copending application Serial No. 552,442, filed September 2, 1944. In this type of electromagnetic clutch, a brake surface is provided which is adapted to be engaged by the driven member of the clutch upon deenergization thereof for the period during which motor 10 is coasting to a stop. This brake surface, in cooperation with the driven member, substantially instantaneously stops motion of the actuator 20, preventing overrunning of the actuator. When motor 10 has substantially stopped rotating, the frictional engagement between the driven clutch disk and the brake surface is released. This permits actuator 20 to be manually driven without the load of motor 10 imposed thereon.

While a specific embodiment of the invention has been shown and described to illustrate the application of the principles thereof, it will be obvious that the invention may be otherwise embodied without departing from such principles.

What is claimed is:

1. A remote position indicator and selector including a housing having a face plate with position indicia thereon and a bearing member; a driving shaft mounted in said bearing member; an element rotatably mounted in said housing and in driving relation with said driving shaft, said element comprising a disk portion and a rim portion integral with said disk portion, said rim portion having apertures therein; a pair of gears of substantially equal diameter rotatably mounted in said housing, one of said gears having at least one more gear tooth than the other gear, one of said gears being fixedly mounted in said housing and the other being rotatably mounted therein and said rotatably mounted gear having a pointer cooperative with said indicia; a pinion rotatably mounted on said element and engaging both of said gears, said pinion being revolvable around the peripheries of said gears to cause relative displacement thereof; an annular member engaging said rim portion and formed with a radially projecting sleeve; a pin slidably mounted in said sleeve; means urging said pin into said apertures; and a crank handle secured to said pin.

2. A remote position indicator and selector including a housing having a face plate with position indicia thereon and a bearing member; a driving shaft mounted in said bearing member; an element rotatably mounted in said housing and in driving relation with said driving shaft, said element comprising a disk portion and a rim portion integral with said disk portion, said rim portion having apertures therein; a pair of gears of substantially equal diameter rotatably mounted in said housing, one of said gears having at least one more gear tooth than the other gear, one of said gears being fixedly mounted in said housing and the other being rotatably mounted therein and said rotatably mounted gear having a pointer cooperative with said indicia; a pinion rotatably mounted on said element and engaging both of said gears, said pinion being revolvable around the peripheries of said gears to cause relative displacement thereof; an annular member engaging said rim portion and formed with a radially projecting sleeve; a pin slidably mounted in said sleeve; means urging said pin into said apertures; and a crank handle secured to said pin; said sleeve and handle being formed with mutually engaging means whereby, in one position of said handle, said pin is retracted from engagement with said apertures.

3. A remote position indicator and selector including a housing having a face plate with position indicia thereon and a bearing member; a driving shaft mounted in said bearing member; a pinion on the inner end of said driving shaft; an element rotatably mounted in said housing and in driving relation with said driving shaft, said element comprising a disk portion, a rim portion integral with said disk portion and a spur gear secured to said disk portion and meshing with said pinion, said rim portion having apertures therein; a pair of gears of substantially equal diameter rotatably mounted in said housing, one of said gears having at least one more gear tooth than the other gear, one of said gears being fixedly mounted in said housing and the other being rotatably mounted therein and said rotatably mounted gear having a pointer cooperative with said indicia; a pinion rotatably mounted on said element and engaging both of said gears, said pinion being revolvable around the peripheries of said gears to cause relative displacement thereof; an annular member engaging said rim portion and formed with a radially projecting sleeve; a pin slidably mounted in said sleeve; means urging said pin into said apertures; and a crank handle secured to said pin.

4. A remote position indicator and selector including a housing having a face plate with position indicia thereon and a bearing member; a driving shaft mounted in said bearing member; a pinion on the inner end of said driving shaft; an element rotatably mounted in said housing and in driving relation with said driving shaft, said element comprising a disk portion, a rim portion integral with said disk portion and a spur gear secured to said disk portion and meshing with said pinion, said rim portion having apertures therein; a pair of gears of substantially equal diameter rotatably mounted in said housing, one of said gears having at least one more gear tooth than the other gear, one of said gears being fixedly mounted in said housing and the other being rotatably mounted therein and said rotatably mounted gear having a pointer cooperative with said indicia; a pinion rotatably mounted on said element and engaging both of said gears, said pinion being revolvable around the peripheries of said gears to cause relative displacement thereof; an annular member engaging said rim portion and formed with a radially projecting sleeve; a pin slidably mounted in said sleeve; means urging said pin into said apertures; and a crank handle secured to said pin; said sleeve and handle being formed with mutually engaging means whereby, in one position of said handle, said pin is retracted from engagement with said apertures.

5. A remote position indicator and selector including a housing having a face plate with position indicia thereon and a bearing member; a driving shaft mounted in said bearing member; a pinion on the inner end of said driving shaft; an element rotatably mounted in said housing and in driving relation with said driving shaft, said element comprising a disk portion, a rim portion integral with said disk portion and a spur gear secured to said disk portion and meshing with said pinion, said rim portion having apertures therein; a pair of gears of substantially equal diameter rotatably mounted in said housing, one of said gears having at least one more gear tooth than the other gear, one of said gears being fixedly mounted in said housing and the other being rotatably mounted therein; a face plate secured to said rotatably mounted gear and carrying a pointer cooperative with said indicia; a pinion rotatably mounted on said element and engaging both of said gears, said pinion being revolvable around the peripheries of said gears to cause relative displacement thereof; an annular member engaging said rim portion and formed with a radially projecting sleeve; a pin slidably mounted in said sleeve; means urging said pin into said apertures; and a crank handle secured to said pin; said sleeve being formed with a cam portion engaging said crank handle whereby, in one position of said handle, said pin is retracted from engagement with said apertures.

WILLIAM P. LEAR.

REFERENCES CITED

The following references are of record in the file of this patent:

UNITED STATES PATENTS

| Number | Name | Date |
| --- | --- | --- |
| 141,521 | Starr | Aug. 5, 1873 |
| 1,477,480 | Groene | Dec. 11, 1923 |
| 1,760,938 | Edgar | June 3, 1930 |
| 1,838,484 | Hitt | Dec. 29, 1931 |
| 2,198,429 | Woodard | Apr. 23, 1940 |
| 2,219,844 | Lotter et al. | Oct. 29, 1940 |
| 2,236,597 | Bruckel | June 16, 1942 |
| 2,366,734 | Lear | Jan. 9, 1945 |